US011680798B2

(12) United States Patent
Avantaggiati

(10) Patent No.: US 11,680,798 B2
(45) Date of Patent: Jun. 20, 2023

(54) DIGITAL DEMODULATOR AND COMPLEX COMPENSATOR FOR MEMS GYROSCOPE

(71) Applicant: InvenSense, Inc., San Jose, CA (US)

(72) Inventor: Vito Avantaggiati, Rome (IT)

(73) Assignee: InvenSense, Inc., San Jose, CA (US)

( * ) Notice: Subject to any disclaimer, the term of this patent is extended or adjusted under 35 U.S.C. 154(b) by 134 days.

(21) Appl. No.: 17/443,806

(22) Filed: Jul. 27, 2021

(65) Prior Publication Data

US 2022/0057209 A1    Feb. 24, 2022

Related U.S. Application Data

(60) Provisional application No. 63/069,305, filed on Aug. 24, 2020.

(51) Int. Cl.
*G01C 19/5712*    (2012.01)
(52) U.S. Cl.
CPC .............................. *G01C 19/5712* (2013.01)
(58) Field of Classification Search
CPC ............ G01C 19/5712; G01C 19/5776; G01C 19/5726
See application file for complete search history.

(56) References Cited

U.S. PATENT DOCUMENTS

| 9,625,272 | B2* | 4/2017 | Tao ..................... G01C 19/5776 |
| 10,302,672 | B2* | 5/2019 | Kanemoto ........... G01C 19/574 |
| 10,718,615 | B2* | 7/2020 | Jandak ................ G01C 19/5691 |
| 11,105,632 | B2* | 8/2021 | Visconti ............. G01C 19/5776 |
| 2013/0199263 | A1* | 8/2013 | Egretzberger ..... G01C 19/5726 73/1.38 |
| 2013/0269413 | A1* | 10/2013 | Tao .......................... B81B 7/008 73/1.38 |
| 2015/0192415 | A1* | 7/2015 | Ge ..................... G01C 19/5776 73/504.13 |
| 2017/0254645 | A1* | 9/2017 | Kanemoto ......... G01C 19/5712 |
| 2018/0128613 | A1* | 5/2018 | Jandak ............... G01C 19/5726 |
| 2021/0302163 | A1* | 9/2021 | Jurgschat ................. G01D 5/00 |
| 2021/0381834 | A1 | 12/2021 | Gregory et al. |
| 2021/0396519 | A1 | 12/2021 | Senkal et al. |

FOREIGN PATENT DOCUMENTS

| CN | 108120452 | 6/2018 |
| CN | 113804171 | 12/2021 |
| CN | 113804185 | 12/2021 |
| CN | 113819897 | 12/2021 |

* cited by examiner

*Primary Examiner* — David J Bolduc
(74) *Attorney, Agent, or Firm* — Van Hoven PC; Joshua Van Hoven

(57) ABSTRACT

A micro electro-mechanical system (MEMS) gyroscope may include a suspended spring-mass system, and processing circuitry configured to receive a drive sense signal and a proof mass sense signal generated by the spring-mass system. The processing circuitry may be configured to derive a drive velocity in-phase signal from a drive displacement in-phase signal and to derive a drive velocity quadrature signal from a drive displacement quadrature signal. A compensated in-phase signal and a compensated quadrature signal may be determined based upon at least the drive displacement in-phase signal, the drive displacement quadrature signal, the drive velocity in-phase signal, the drive velocity quadrature signal, the sense displacement in-phase signal, and the sense displacement quadrature signal.

20 Claims, 7 Drawing Sheets

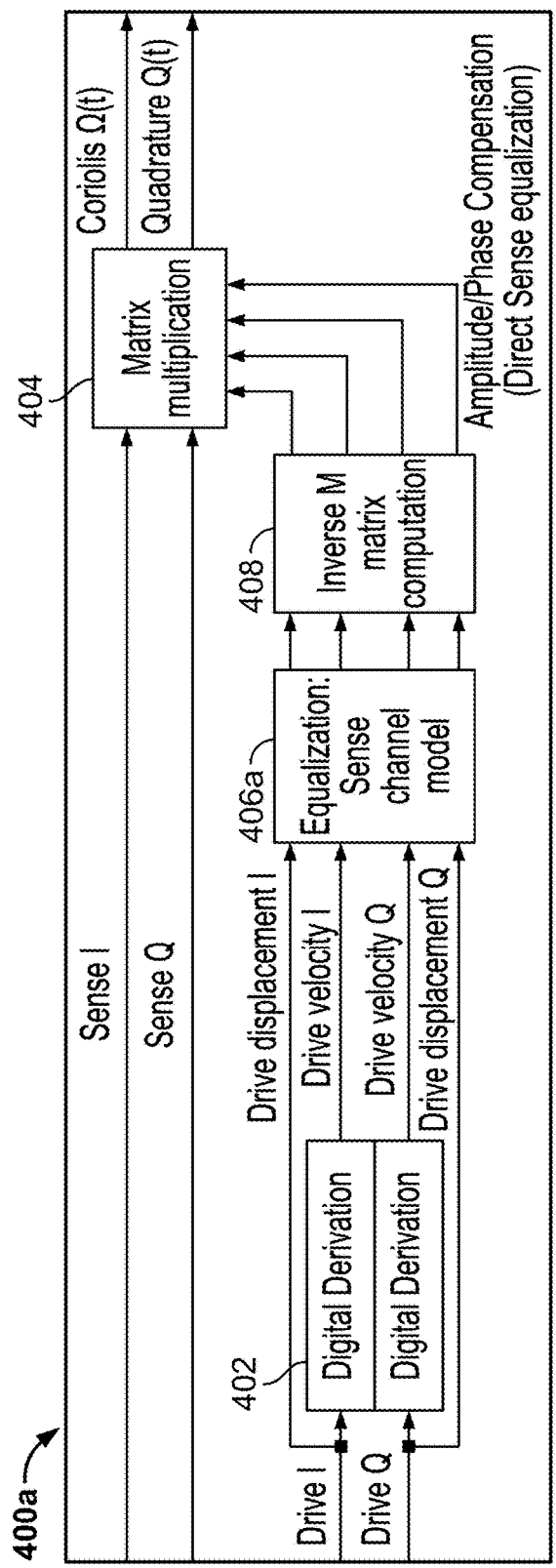
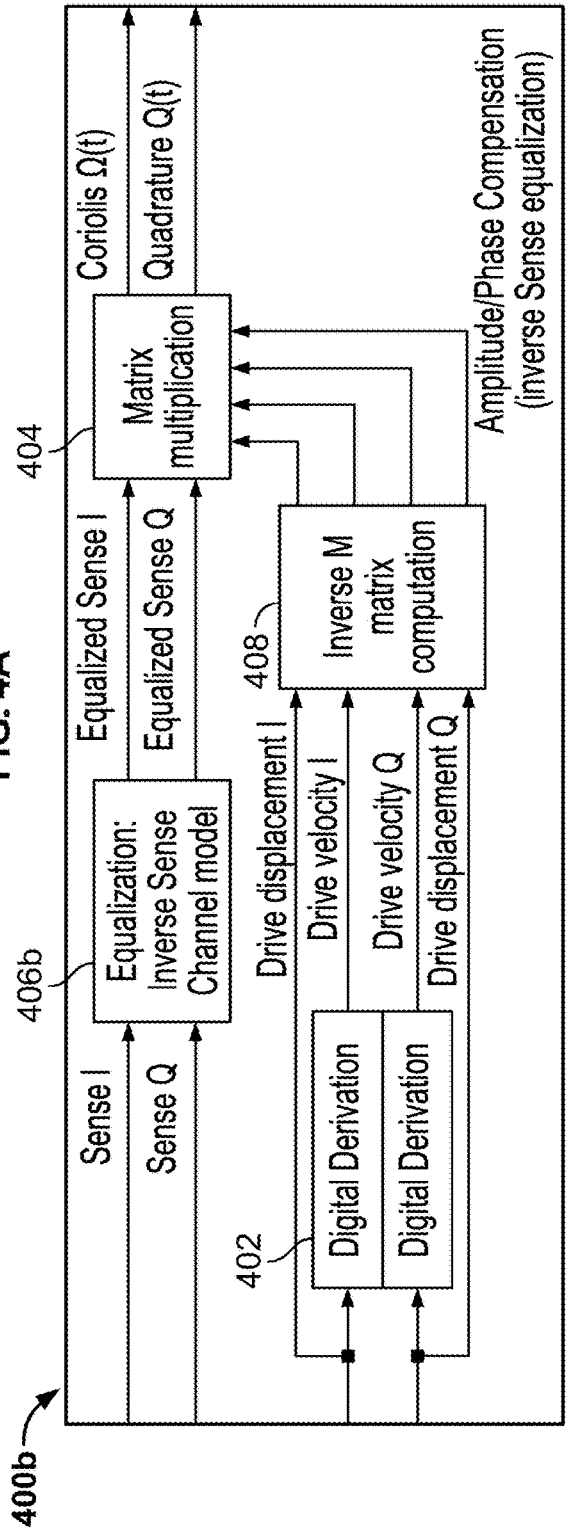
FIG. 4A
FIG. 4B

DIGITAL DEMODULATOR AND COMPLEX COMPENSATOR FOR MEMS GYROSCOPE

CROSS-REFERENCE TO RELATED APPLICATION

This application claims priority to U.S. Provisional Patent Application No. 63/069,305, filed on Aug. 24, 2020, the contents of which are hereby expressly incorporated by reference in their entirety.

BACKGROUND

Numerous items such as smartphones, smart watches, tablets, automobiles, aerial drones, appliances, aircraft, exercise aids, and game controllers utilize sensors during their operation (e.g., motion sensors, pressure sensors, temperature sensors, etc.). In commercial applications, microelectromechanical (MEMS) sensors such as accelerometers and gyroscopes capture complex movements and determine orientation or direction. For example, smartphones are equipped with accelerometers and gyroscopes to understand the movement of the smartphone, to augment navigation systems that rely on Global Position System (GPS) information, and to perform numerous other functions. Wearable devices and internet-of-things (IoT) devices constantly measure movement and other characteristics of a person, animal, or electronic device. In another example, drones and aircraft determines orientation based on gyroscope measurements (e.g., roll, pitch, and yaw) and vehicles of all types implement assisted driving to improve safety (e.g., to recognize skid or roll-over conditions).

Accelerometers or gyroscopes of a MEMS system, when housed in a MEMS chip, may be subject to certain manufacturing or in-field external stresses. During manufacturing, even typical tolerances may result in the MEMS chip experiencing certain imparted forces as stress. Component installation during production processes, such as soldering, can induce forces absorbed by the MEMS chip as stress. Other manufacturing processes with stress-inducing conditions may occur during packaging such as the MEMS system susceptibility to board-bending. In-field stress sources may also vary. For example, the MEMS device may experience displacement of moving mechanical parts from normal wear and bending conditions from transport. An external stress impact on a MEMS system can propagate to cause a corresponding impact on the internal sensors of the system. For example, a stress with a bending effect on the MEMS chip corresponds to a related stress experienced by the accelerometer of the MEMS chip. Externally induced stresses can introduce errors into the accelerometer measurements. Changes in environmental conditions such as temperature may result in stresses imparted on the MEMS chip. These stresses may result in measurement errors of a MEMS sensor such as a MEMS accelerometer or MEMS gyroscope. Further, measurement error in a MEMS gyroscope may occur as a result of drift or error in drive signal input.

SUMMARY

In at least some example illustrations, a micro electro-mechanical system (MEMS) gyroscope may include a suspended spring-mass system, including a drive mass and a proof mass, and a drive sense electrode for generating a drive sense signal corresponding to displacement of the drive mass. The gyroscope may also include a proof mass sense electrode for generating a proof mass sense signal corresponding to displacement of the proof mass. The gyroscope may further include processing circuitry configured to receive the drive sense signal and proof mass sense signal. The processing circuitry may also be configured to generate from the drive sense signal a drive displacement quadrature signal and a drive displacement in-phase signal, and to generate from the proof mass sense signal a sense displacement quadrature signal and a sense displacement in-phase signal. The processing circuitry may also be configured to derive a drive velocity in-phase signal from the drive displacement in-phase signal and to derive a drive velocity quadrature signal from the drive displacement quadrature signal. Further, the processing circuitry may be configured to determine a compensated sense in-phase signal and a compensated sense quadrature signal based upon at least the drive displacement in-phase signal, the drive displacement quadrature signal, the drive velocity in-phase signal, the drive velocity quadrature signal, the sense displacement in-phase signal, and the sense displacement quadrature signal.

At least some example illustrations are directed to a method of compensating drive signal error in a micro electro-mechanical system (MEMS) gyroscope having a suspended spring-mass system including a drive mass and a proof mass. The method may include receiving, at a processing circuitry, a drive sense signal from a drive sense electrode, the drive sense signal corresponding to displacement of the drive mass; and receiving, at the processing circuitry, a proof mass sense signal from a proof mass sense electrode, the proof mass sense signal corresponding to displacement of the proof mass. The method may also include generating, from the drive sense signal, a drive displacement quadrature signal and a drive displacement in-phase signal; and generating, from the proof mass sense signal, a sense displacement quadrature signal and a sense displacement in-phase signal. The method may further include deriving a drive velocity in-phase signal from the drive displacement in-phase signal; and deriving a drive velocity quadrature signal from the drive displacement quadrature signal. Additionally, the method may include determining, using the processing circuitry, a compensated sense in-phase signal and a compensated sense quadrature signal based upon at least the drive displacement in-phase signal, the drive displacement quadrature signal, the drive velocity in-phase signal, the drive velocity quadrature signal, the sense displacement in-phase signal, and the sense displacement quadrature signal.

BRIEF DESCRIPTION OF THE DRAWINGS

The above and other features of the present disclosure, its nature and various advantages will be more apparent upon consideration of the following detailed description, taken in conjunction with the accompanying drawings in which:

FIG. 4A illustrates an example matrix multiplication of drive sense signals and sense signals of a compensation function in the system of FIG. 3, in accordance with some embodiments of the present disclosure;

FIG. 4B illustrates another example matrix multiplication of drive sense signals and sense signals of a compensation function in the system of FIG. 3, in accordance with some embodiments of the present disclosure;

DETAILED DESCRIPTION

Figure 1:
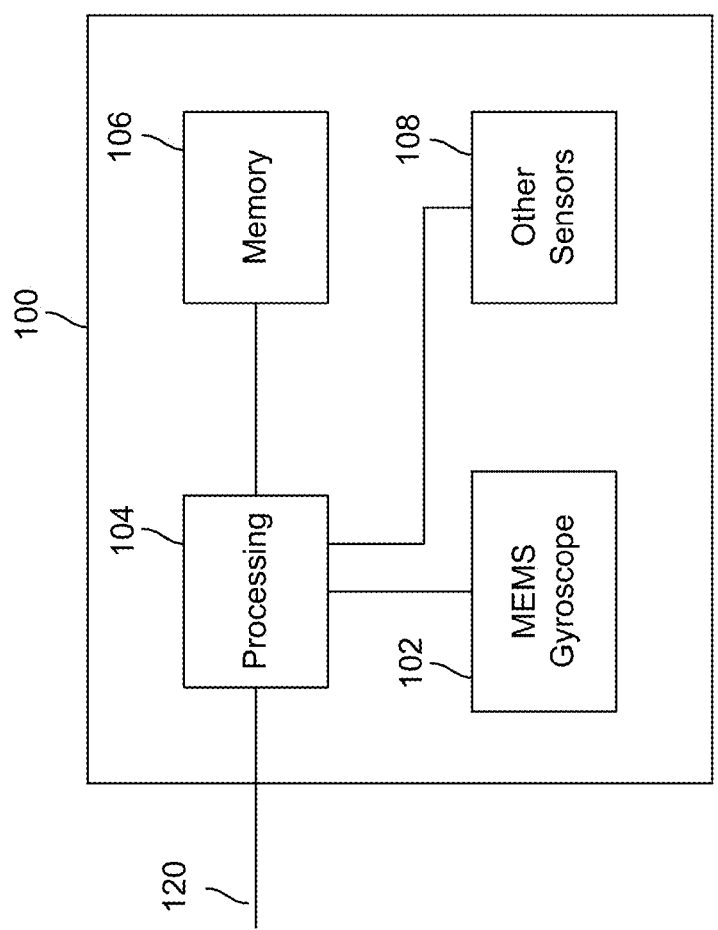
FIG. 1 depicts an exemplary motion sensing system in accordance with some embodiments of the present disclosure.

A MEMS gyroscope includes drive circuitry that generates an electrical drive signal that is a periodic signal having a drive frequency. The drive signal is applied to a suspended spring-mass system of the MEMS gyroscope to cause movement of one or more masses of the suspended spring-mass system, such as drive masses, for example, by applying the electrical drive signal to drive electrodes located adjacent to the drive masses. The drive signal mechanically propagates through the suspended spring-mass system in a manner such that a rotation about an axis of interest (e.g., an axis perpendicular to a drive axis of a mass of the suspended spring-mass system) causes a Coriolis force along a sense axis (e.g., an axis perpendicular to the drive axis and the axis of interest). The Coriolis force is sensed by a proof mass that moves in the direction of the Coriolis force, e.g., at the drive frequency. The movement of the proof mass is sensed, for example, by an adjacent electrode that forms a capacitor with the proof mass, the capacitance of which changes based on the movement of the proof mass.

The suspended spring-mass system also experiences a quadrature error due to movements of the components of the suspended spring-mass system. The quadrature error occurs at the same frequency as the sensed Coriolis force but is 90 degrees out of phase with the Coriolis (i.e., "in-phase") signal. Accordingly, a sense signal based on the movement of the suspended spring-mass system includes both the in-phase content corresponding to the magnitude of the sensed angular velocity and quadrature content corresponding to the quadrature error of the suspended spring-mass system. As part of the processing of the sense signal, a demodulation signal corresponding to the drive signal is typically applied to the sense signal to demodulate the sense signal from the drive frequency. The accuracy of the ultimate output signal of the MEMS gyroscope depends upon the alignment of the phase of the demodulation signal with the phase of the in-phase component of the sense signal. If the phase of the demodulation signal is not aligned with the in-phase component of the sense signal, not only is the output of the sense signal corresponding to a sensed angular velocity reduced, but also the quadrature signal contribution to the output signal is increased. Existing procedures for aligning the phase of the demodulation signal with the phase of the sense signal are described, for example, in commonly owned U.S. Pat. No. 10,267,650, entitled "DEMODULATION PHASE CALIBRATION" and filed on Jun. 3, 2016; U.S. Provisional Patent Application No. 62/598,332, entitled "DEMODULATION PHASE CALIBRATION USING EXTERNAL INPUT" and filed on Dec. 13, 2017; U.S. patent application Ser. No. 16/217,509, entitled "DEMODULATION PHASE CALIBRATION USING EXTERNAL INPUT" and filed on Dec. 12, 2018; U.S. Provisional Patent Application No. 62/880,316, entitled "ROBUST METHOD FOR TUNING OF GYROSCOPE DEMODULATION PHASE" and filed on Jul. 30, 2019, and U.S. patent application Ser. No. 16/845,559, entitled "ROBUST METHOD FOR TUNING OF GYROSCOPE DEMODULATION PHASE" and filed on Apr. 10, 2020, each of which is incorporated by reference herein in its entirety.

In some MEMS gyroscopes, control of drive mass movement is performed with a feedback loop that is relied upon to oscillate the drive mass at a resonance frequency with a constant amplitude, with the aid of an automatic gain controller (AGC). A phase-locked loop (PLL) may be synchronized to the oscillation frequency of the drive system, and generally produces a higher frequency clock at a multiple of the drive frequency. The sense path may be demodulated using an analog demodulator. Gain and offset variations, e.g., due to temperature fluctuations, may be compensated after the demodulation using calibration and characterization techniques.

The foregoing approaches, however, generally require that the MEMS device maintain a fixed drive signal over time. Drive circuits used to apply this regulation, however, have tolerances that can impact the accuracy and repeatability of the drive signal. Additionally, a drive signal of the device may change as a function of temperature and over the service life of a device. Accordingly, MEMS characteristics that tend to vary over time, e.g., a drive quadrature or "Q" signal, or a sense quadrature/Q signal, are difficult to compensate accurately in response to temperature variations and degradations in performance over a service lifetime of the sensor. Drive circuits also have imperfections and may cause the gyroscope to oscillate slightly away from its natural frequency. The phase of the quadrature may be offset 90 degrees from the in-phase signal, causing errors in offset compensation. Additionally, in such systems the drive subsystem generally cannot be duty cycled to save power.

Accordingly, the present disclosure is directed to improved correction methodologies and systems for a MEMS gyroscope. Demodulation and compensation are performed based on a measured drive sense signal and signals determined therefrom. These signals in turn are used for demodulation and compensation based on relationships with a sense signal measured from movement of proof masses (e.g., due to a Coriolis force) and signals derived therefrom.

In examples herein, a drive mass may be excited by a drive signal, which may be sensed by a drive mass sense electrode as a drive mass displacement signal $x_d(t)$. A velocity derived from the drive mass sense signal may correspond to the derivative of that signal, and may therefore be $v_d(t)=\dot{x}_d(t)$. A proof mass sense signal $x_s(t)$ based on movement of a proof mass that is coupled to the drive mass, may be expressed as a function of a of Coriolis signal $\Omega(t)$, drive velocity signal, a quadrature signal $Q(t)$, and drive displacement signal, and may be expressed as:

$$x_s(t)=\Omega(t)v_d(t)+Q(t)x_d(t)$$

An exemplary drive sense signal $x_d(t)$ may have spectral content near the drive resonance $\omega_d$, and may be considered as a pure sinusoidal tone, or a narrowband signal centered at a frequency $\omega_{dmd}=2\pi f_{dmd}$ near $\omega_d$ (at limit it may be the same). It is not required that $f_{dmd}$ be equal to the drive frequency, and drive signal bandwidth may be higher or lower than a width of the resonance peak.

Both the proof mass sense and the drive sense signals may be downconverted by using the frequency $f_{dmd}$, thus achieving the related in-phase (I) and quadrature (Q) components:

$$[x_{sI}(t), x_{sQ}(t), x_{dI}(t), x_{dQ}(t)]$$

The in-phase and quadrature components of the downconverted proof mass sense signal may be expressed in terms of the in-phase (I) and quadrature (Q) components of the drive sense signal, as follows:

$$x_{sI}(t) = \Omega(t)v_{dI}(t) + Q(t)x_{dI}(t)$$

$$x_{sQ}(t) = \Omega(t)v_{dQ}(t) + Q(t)x_{dQ}(t)$$

Extraction of the in-phase portion of the poof mass sense signal after the downconversion can be performed by solving a system of equations. By assuming that the I & Q components of the drive sense signal are acquired and downconverted, previous equations become a time-varying system of equations in the unknowns [$\Omega(t)$, Q(t)], given the time-varying coefficients [$v_{dI}$ (t), $x_{dI}$(t)] which solution is given by:

$$\begin{bmatrix} x_{sI}(t) \\ x_{sQ}(t) \end{bmatrix} = \begin{bmatrix} v_{dI}(t) & x_{dI}(t) \\ v_{dQ}(t) & x_{dQ}(t) \end{bmatrix} \begin{bmatrix} \Omega(t) \\ Q(t) \end{bmatrix} = M(t) \begin{bmatrix} \Omega(t) \\ Q(t) \end{bmatrix} \Rightarrow$$

$$\Rightarrow \begin{bmatrix} \Omega(t) \\ Q(t) \end{bmatrix} = M^{-1}(t) \begin{bmatrix} x_{sI}(t) \\ x_{sQ}(t) \end{bmatrix}$$

The above matrix operation may thereby provide a real time method for removing all effects of the drive signal from the sense channel, based on values extracted from the drive sense signal and proof mass sense signal as will be described further below. Removing these effects may not only provide for effective phase alignment but may also compensate for other errors that occur over time or under certain conditions (e.g., temperature), as described herein.

Turning now to FIG. 1, an exemplary motion sensing system 100 is illustrated in accordance with some embodiments of the present disclosure. Although particular components are depicted in FIG. 1, it will be understood that other suitable combinations of sensors, processing components, memory, and other circuitry may be utilized as necessary for different applications and systems. In an embodiment as described herein, the motion sensing system 100 may include at least a MEMS gyroscope 102 (e.g., a single- or multi-axis gyroscope for measuring angular velocity about one or more axes) and supporting circuitry, such as processing circuitry 104 and memory 106. In some embodiments, one or more additional sensors 108 (e.g., MEMS gyroscopes, MEMS accelerometers, MEMS microphones, MEMS pressure sensors, and a compass) may be included within the motion processing system 100 to provide an integrated motion processing unit ("MPU") (e.g., including 3 axes of MEMS gyroscope sensing, 3 axes of MEMS accelerometer sensing, microphone, pressure sensor, and compass).

Processing circuitry 104 may include one or more components providing necessary processing based on the requirements of the motion sensing system 100. In some embodiments, processing circuitry 104 may include hardware control logic that may be integrated within a chip of a sensor (e.g., on a substrate or capacitor of a MEMS gyroscope 102 or other sensor 108, or on an adjacent portion of a chip to the MEMS gyroscope 102 or other sensor 108) to control the operation of the MEMS gyroscope 102 or other sensors 108 and perform aspects of processing for the MEMS gyroscope 102 or other sensors 108. In some embodiments, the MEMS gyroscope 102 and other sensors 108 may include one or more registers that allow aspects of the operation of hardware control logic to be modified (e.g., by modifying a value of a register). In some embodiments, processing circuitry 104 may also include a processor such as microprocessor that executes software instructions, e.g., that are stored in memory 106. The microprocessor may control the operation of the MEMS gyroscope 102 by interacting with the hardware control logic, and process signals received from MEMS gyroscope 102. The microprocessor may interact with other sensors in a similar manner. In some embodiments, some or all of the functions of the processing circuitry 104, and in some embodiments, of memory 106, may be implemented on an application specific integrated circuit ("ASIC").

Although in some embodiments (not depicted in FIG. 1), the MEMS gyroscope 102 or other sensors 108 may communicate directly with external circuitry (e.g., via a serial bus or direct connection to sensor outputs and control inputs), in an embodiment, the processing circuitry 104 may process data received from the MEMS gyroscope 102 and other sensors 108 and communicate with external components via a communication interface 120 (e.g., an SPI or I2C bus, in automotive applications a controller area network (CAN) or Local Interconnect Network (LIN) bus, or in other applications suitable wired or wireless communications interfaces as is known in the art). The processing circuitry 104 may convert signals received from the MEMS gyroscope 102 and other sensors 108 into appropriate measurement units (e.g., based on settings provided by other computing units communicating over the communication bus 120) and perform more complex processing to determine measurements such as orientation or Euler angles, and in some embodiments, to determine from sensor data whether a particular activity (e.g., walking, running, braking, skidding, rolling, etc.) is taking place. In some embodiments, some or all of the conversions or calculations may take place on the hardware control logic or other on-chip processing of the MEMS gyroscope 102 or other MEMS sensors 108.

In some embodiments, certain types of information may be determined based on data from multiple MEMS gyroscopes 102 and other sensors 108, in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

As will be discussed in further detail below, the MEMS gyroscope 102 generally includes a drive mass that oscillates during use. The MEMS gyroscope 102 also includes a proof mass that moves in response to sensed movement(s) of the MEMS gyroscope 102. Movement of the drive mass is sensed by an electrode, while movement of the proof mass is also sensed by an electrode. In-phase and quadrature signals are derived from the sensed drive mass displacement and proof mass displacement signals. Additionally, a drive mass velocity signal having in-phase and quadrature components is also derived from the drive mass displacement in-phase and quadrature signal components. Based on each of these signals, example illustrations may demodulate and compensate to acquire a sense signal (Coriolis force). Moreover, as will be discussed further below example approaches may reduce errors in the sense signal. Merely as one example, errors may be cause by inaccuracies or tolerances in the sensed drive mass signals, which may be reduced or eliminated by example approaches described further below.

Figure 2:
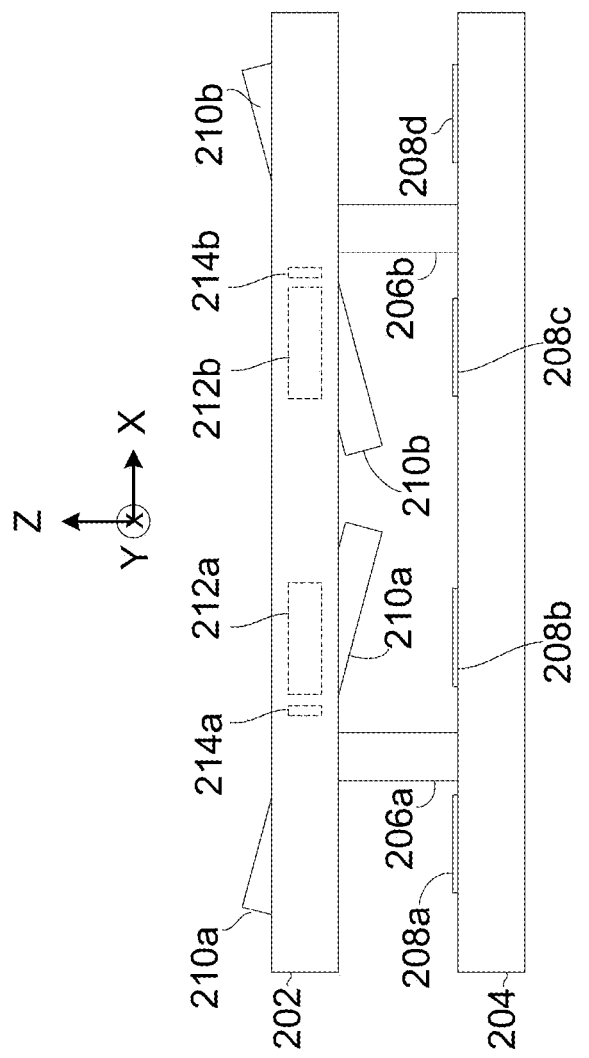
FIG. 2 shows a block diagram of an exemplary MEMS gyroscope in accordance with some embodiments of the present disclosure.

FIG. 2 shows an exemplary MEMS gyroscope in accordance with some embodiments of the present disclosure. The exemplary MEMS gyroscope of FIG. 2 is simplified for the purposes of illustration. It will be understood that a MEMS gyroscope as described in the present disclosure may include any suitable MEMS gyroscope design, including single-axis or multi-axis MEMS gyroscopes. Although portions of the present disclosure may be described in the context of a particular type of MEMS gyroscope configuration (e.g., a single-axis out-of-plane sensing gyroscope), it will be understood that the present disclosure may apply equally to other types and configurations of MEMS devices.

An illustrative MEMS gyroscope 200 comprises MEMS layer 202, substrate layer 204 (e.g., a CMOS substrate layer), and anchors 206a and 206b separating the layers and located within a gap between the two layers. Packaging and additional layers (e.g., a cap layer) are not shown in FIG. 2 for ease of illustration but may be coupled to the MEMS layer 202 and/or substrate layer 204 to form a hermetically sealed cavity in which the movable MEMS components of a suspended spring-mass system (e.g., drive masses 212a and 212b, Coriolis masses (not depicted), proof masses 210a and 210b, and additional springs and/or masses coupled thereto (not depicted)) are able to move. The cavity may have a nominal pressure (e.g., at or near a vacuum pressure, or another suitable pressure for other particular designs). In the exemplary embodiment of FIG. 2, a bottom plane of the suspended spring-mass system of the MEMS layer 202 is located parallel to an upper plane of the substrate layer 204 and proof mass sense electrodes 208a-208d are located thereon. Drive mass sense electrodes 214a and 214b are located adjacent to the drive masses 212a and 212b for sensing movement thereof (e.g., imparted by drive electrodes, not depicted in FIG. 2).

MEMS layer 202 includes a suspended spring-mass system including proof masses 210a and 210b and drive masses 212a and 212b, which are suspended from anchors 206a and 206b, respectively, by interconnected springs and/or masses (not visible in FIG. 2). The components of the suspended spring-mass system are sized and configured in a manner to facilitate movement of the proof masses 210a and 210b in response to the movement of the drive masses 212a and 212b and an inertial force to be measured, e.g., angular velocity about an axis perpendicular to the drive axis. Although not depicted in FIG. 2, drive circuitry may provide drive signals to the drive masses 212a and 212b of the suspended spring-mass system (e.g., via drive electrodes). For example, in a MEMS gyroscope, a drive signal may create a physical drive motion of one or more components (e.g., drive masses 212a and 212b) that in turn results in a Coriolis force experienced by the proof masses 210a and 210b when the gyroscope is rotated about an axis of interest. In an exemplary embodiment, the drive circuitry may provide the drive signal via one or more drive electrodes (e.g., a capacitive plate, comb electrode, etc.) located adjacent to components of the suspended spring-mass system (e.g., drive masses 212a and 212b, etc.). Drive mass sense electrodes 214a and 214b are each located at a fixed location adjacent to a respective drive mass 212a or 212b, and each outputs a signal (e.g., a capacitive signal) corresponding to the displacement of the respective drive mass 212a/212b in response to the drive signal.

In the exemplary embodiment of FIG. 2, the proof masses are designed to move along the direction of the z-axis in response to the measured inertial force (e.g., rate of rotation or angular velocity for a gyroscope). For example, an illustrative MEMS gyroscope 200 includes a suspended spring-mass system including movable drive masses 212a and 212b and movable proof masses 210a and 210b, springs and additional components such as lever arms and Coriolis masses (not depicted in FIG. 2, but located within and patterned from MEMS layer 202) connecting the drive masses to the proof masses. The springs and other movable components of the spring-mass system are coupled to the drive masses 212a/212b and proof masses 210a/210b, and are selectively patterned and positioned such that they are relatively rigid in response to forces in directions in which it is not desired to impart the drive motion or measure the inertial force and relatively flexible in a direction in which a force is to be imparted or measured.

Proof mass 210a is suspended over proof mass sense electrodes 208a and 208b and proof mass 210b is suspended over proof mass sense electrodes 208c and 208d. In response to a z-axis movement of the proof masses due to an angular velocity experienced by a MEMS gyroscope (e.g., due to rotation of a device including a MEMS gyroscope about an axis perpendicular to the z-axis and the axis of the drive motion imparted by drive masses 212a and 212b), the proof masses 210a and 210b rotate out of the plane of the MEMS layer (e.g., about the y-axis) such that portions of the proof mass move closer to or farther away from respective proof mass sense electrodes, with the degree of rotation (e.g., how much the proof masses move with respect to the respective proof mass sense electrodes) based on the magnitude of the angular velocity and the motion imparted by the drive mass. The design of the suspended spring-mass system may be such that the proof masses 210a and 210b have minimal movement out of the MEMS plane in the absence of angular velocity about the sense axis.

In the exemplary embodiment of FIG. 2, the movement of the proof masses 210a and 210b out of the MEMS plane may be sensed using electrostatic sensing as depicted in FIG. 2. Fixed proof mass sense electrodes 208a, 208b, 208c, and 208d are located parallel to the proof masses (e.g., on substrate layer 204 below proof masses 210a and 210b) to form capacitors with portions of the proof masses (e.g., electrode 208a forms a capacitor with a first portion of proof mass 210a, electrode 208b forms a capacitor with a second portion of proof mass 210a, electrode 208c forms a capacitor with a first portion of proof mass 210b, and electrode 208d forms a capacitor with a second portion proof mass 210b). The capacitance of each of the proof masses may change based on the relative distance between each proof mass portion and its associated proof mass sense electrodes. In the embodiment of FIG. 2, these capacitances and the capacitances sensed by the drive mass sense electrodes are used by processing circuitry (e.g., in the substrate layer 204) to determine the inertial force (e.g., by demodulating and compensating the sensed movement of the proof masses to isolate the Coriolis force from other forces and signals, such as a quadrature signal of the MEMS gyroscope structure). Although electrostatic sensing is described in the embodiment of FIG. 2, it will be understood that other forms of sensing (e.g., piezoelectric, infrared, or magnetic) may be used in other embodiments. While some or all of the processing circuitry may be described as located within a substrate layer 204 (e.g., a CMOS substrate layer), in some embodiments a substrate may not include active processing components, and may instead simply perform functions such as routing signals to other processing circuitry (e.g., on adjacent components to the MEMS sensor and/or stacked on layers above or below the substrate or cap of the MEMS sensor).

Figure 3:
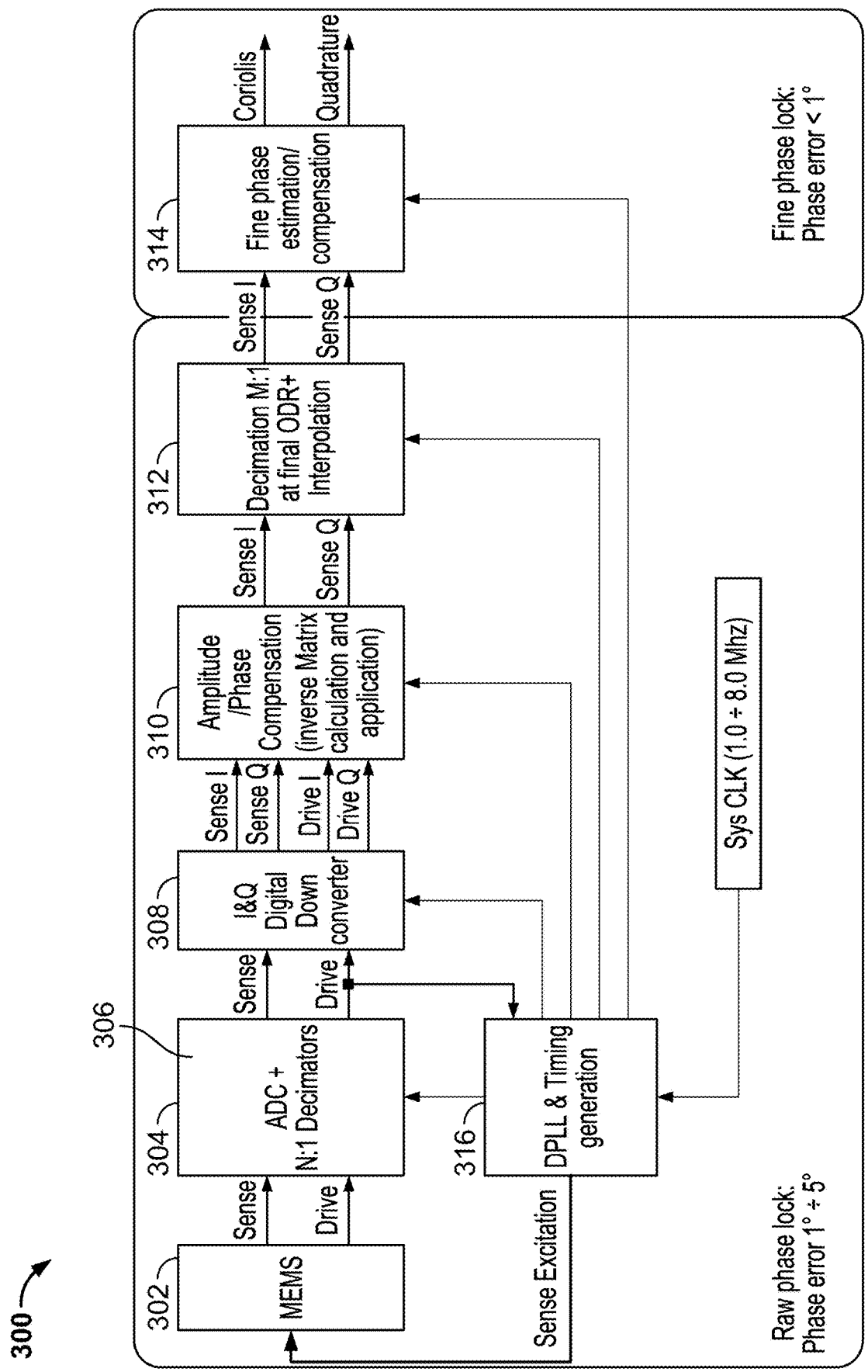
FIG. 3 illustrates an example signal processing architecture including circuitry for demodulation and compensation of a MEMS gyroscope, in accordance with some embodiments of the present disclosure.

FIG. 3 depicts an exemplary signal processing architecture 300 including circuitry for demodulation and compensation of a MEMS gyroscope 302, in accordance with some embodiments of the present disclosure. Although particular components are depicted in FIG. 3 for a particular sensor, it will be understood that some of the components may be modified, removed, or replaced, and that the order of certain operations may be modified while retaining the demodulation and compensation features described herein. The MEMS gyroscope 302 may be MEMS gyroscope 200 in at least some example approaches.

The example signal processing architecture 300 illustrated in FIG. 3 generally digitizes, down-converts, processes, and decomposes drive mass sense signals and proof mass sense signals output from the MEMS gyroscope 302. An exemplary drive signal of the gyroscope 302 generally is a periodic signal (e.g., a sum of sine waves, which frequencies are multiples of the repetition frequency) having a frequency and peak-to-peak voltage suitable for driving components such as drive masses of a suspended spring-mass system, e.g., of the MEMS gyroscope 200. The drive signal may be applied to the suspended spring-mass system via components such as (e.g., drive plates or drive combs), which induce movement on adjacent components such as drive masses of the suspended spring-mass system. The movement of the drive mass(es) is sensed by drive sense circuitry (e.g., one or more drive sense electrodes adjacent to drive masses), may include both in-phase and quadrature components, and is output from the gyroscope 302.

The movement of the drive masses also propagates through the suspended spring-mass system such that when a rotation occurs about an axis of interest, proof masses of the suspended spring-mass system move in a particular direction (e.g., perpendicular to a drive direction and the axis of rotation) with respect to proof mass sense electrodes (e.g., parallel capacitive plates with respect to the proof masses) at the drive frequency and with an amount of movement based on the angular velocity of the rotation. The suspended spring-mass system also induces a quadrature error based on the drive frequency, the magnitude and phase of which is based on the particular design of the suspended spring-mass system, wear on the system, stresses experienced by the system, temperature, and the like. This quadrature error is sensed by the proof mass sense electrodes with the desired (in phase or Coriolis) signal.

The movement of the proof masses of the suspended spring-mass system relative to the proof mass sense electrodes corresponds to one or more capacitances that are measured by capacitance-to-voltage (C2V) converter (not shown in FIG. 3), which converts the changing capacitance due to proof mass movement into the usable electrical proof mass sense signal (e.g., with a voltage and/or current that varies in proportion to the change in the capacitance between the proof masses of the suspended spring-mass system and the proof mass sense electrodes). In a similar manner, the movement of the drive masses of the suspended spring-mass system relative to the drive sense electrodes corresponds to one or more capacitances that are measured by C2V convers and converting the changing capacitance due to drive mass movement into the usable electrical drive mass sense signal (e.g., with a voltage and/or current that varies in proportion to the change in the capacitance between the drive masses of the suspended spring-mass system and the drive mass sense electrodes).

The sense mass sense signal and drive mass sense signal output from the MEMS gyroscope 302 may be digitized and processed by a complex downconverter to recover the respective in-phase (I) and quadrature (Q) portions of each of the drive sense signal and proof mass sense signal. For example, as illustrated in FIG. 3, each of the proof mass sense signal and drive sense signal outputs of the MEMS gyroscope 302 may be provided to analog-to-digital converter (ADC) 304 and decimation circuitry 306, to digitize the respective output signals (e.g., based on a particular clock rate and bit resolution of the ADC) and to reduce the frequency of each of the signals for further processing steps (e.g., according to the N:1 decimation rate). The digitized drive sense signal may be supplied to DPLL and timing generation circuitry 316 for further processing and alignment with timing signals provided to the processing circuitry. In addition, the digitized proof mass sense signal and digitized drive sense signal may be supplied to a complex digital downconverter 308 to decompose each of the signals to generate respective in-phase and quadrature signals, such as a proof mass sense in-phase signal (Sense I), a proof mass sense quadrature signal (Sense Q), a drive sense in-phase signal (Drive I), and a drive sense quadrature signal (Drive Q), each of which may be output to amplitude/phase compensator 310.

As will be discussed further below, matrix inversion after the digital downconversion, e.g., at the amplitude/phase compensator 310, may be employed to compensate for both amplitude and phase impairments or errors. The compensated proof mass sense in-phase signal (Sense I) and compensated proof mass sense quadrature signal (Sense Q) may be supplied to a decimator 312, and from decimator 312, to fine phase estimation compensation (e.g, at a reduced frequency based on the M:1 decimation). Further fine estimation and/or compensation of the phase may be done at block 314 based upon input received from a local digital phase-locked loop (DPLL) 316, by minimizing correlation between in-phase and quadrature channels of the proof mass sense signals along the blocks 304, 306, 308, 310, 312. The output may correspond to a Coriolis signal (e.g., based on compensated Sense I) and a quadrature signal (e.g., based on compensated Sense Q).

Generally, the drive mass of the MEMS gyroscope 302 may be activated at a frequency close to a resonance frequency. The DPLL 316 can be used to synchronize the drive system of the MEMS gyroscope 302 to the drive resonance of the MEMS gyroscope 302. Accuracy of DPLL 316 may be on the order of a few percent, without need for accurate matching of frequency. As a result, a low power digital oscillator can drive the drive mass(es) of the MEMS gyroscope 302. Additionally, the drive signal may be arbitrary, and as such alternative approaches without the DPLL 316 are also possible, depending generally upon a degree of degradation in signal-to-noise ratio (SNR).

Turning now to FIGS. 4A and 4B, example compensation functions 400a, 400b (collectively, 400) for demodulating and compensating drive system effects on the sense signal (e.g., corresponding to amplitude/phase compensation 310 of FIG. 3) are illustrated and described in further detail. As will be elaborated further below, each of the compensation functions 400 generally may determine a digital derivation of a drive sense signal (I and Q) to determine a drive mass velocity (I and Q), a drive channel compensation using a matrix inversion of the measured drive sense signals, and in some examples a sense channel equalization.

Equalization may be needed or beneficial in some example approaches because while the Drive signal is processed only by the Drive MEMS Transfer Function, the Sense signal is processed first by the Drive MEMS transfer function, and then also by the Sense MEMS transfer function. For this reason, before executing the matrix processing, the Drive and the Sense signals should generally be balanced such that they are processed by the same transfer functions chain. This "equalization" may be done (1) by adding the effect of the Sense MEMS transfer function to the Drive signal before applying the matrix multiplication, e.g., as described below in the direct Sense Channel Model 406a, or (2) by removing the effect of the Sense MEMS transfer function from the Sense channel before calculating the inverse matrix coefficients, e.g., by means of the Inverse Sense Channel model 406b described below. In this way, the signal on the Drive and the Sense digital path turns out to be treated with the same transfer functions chain before the matrix processing is applied.

In at least some examples, compensation functions 400 may be employed to correct output of a MEMS gyroscope, e.g., in compensator 310 of the signal processing architecture 300 described above.

With respect to each of the example compensation functions 400, a drive mass sense electrode and a proof mass sense electrode in a suspended spring-mass system, e.g., of MEMS gyroscope 200 or 302, may generate a drive sense signal corresponding to displacement of the drive mass and a proof mass sense signal corresponding to displacement of the proof mass, respectively, as discussed above. Each of the compensation functions 400 illustrated in FIGS. 4A and 4B may generally receive a drive displacement quadrature signal ("Drive Q") and a drive displacement in-phase signal ("Drive I") generated from the drive sense signal, e.g., by digital downconverter 308. Each of the compensation functions 400 may also receive a proof mass displacement quadrature signal ("Sense Q") and a proof mass displacement in-phase signal ("Sense I") generated from the proof mass sense signal, e.g., by digital downconverter 308. Each of the compensation functions 400 may include a derivation block 402, which may generally derive from one or more displacement inputs or signals a corresponding velocity output(s). More specifically, as shown in FIGS. 4A and 4B, at each of the derivation blocks 402 of the compensation functions 400, a drive velocity in-phase signal ("Drive velocity I") is derived from the drive displacement in-phase signal (e.g., as a derivative of the displacement signal). Additionally, a drive velocity quadrature signal ("Drive velocity Q") may also be output from derivation block 402 based upon the received drive displacement quadrature signal.

As will be described further below, each of the architectures may determine a compensated in-phase signal ("Coriolis Ω(t)") and a compensated quadrature signal ("Quadrature (t)") as corrected versions of a sense in-phase and a sense quadrature signal, respectively, based upon the (a) a plurality of drive sense signals and (b) a plurality of sense signals. In an example, the drive sense signals include, as illustrated in FIGS. 4A and 4B, the above-described drive displacement in-phase signal, the drive displacement quadrature signal, the drive velocity in-phase signal, and the drive velocity quadrature signal; and the plurality of sense signals includes the above-mentioned sense in-phase signal and the sense quadrature signal. Each of the architectures 400 may employ a matrix manipulation to determine the compensated in-phase signal and the compensated quadrature signal, thereby correcting the sense in-phase signal and sense quadrature signal received from the MEMS accelerometer 200/302 by removing variations or error induced by the system. The example architectures 400 each employ an inverse matrix computation and a matrix multiplication with respect to the various drive sense signals and sense signals, as described further below. It should be noted that a "matrix" may have a multiple column/row configuration or may be a single-column or single-row vector (i.e., a N×1 or 1×N vector).

Each of the example compensation functions 400a and 400b are configured to determine the compensated in-phase signal and the compensated quadrature signal based upon a matrix multiplication of drive sense signals and sense signals. A sense equalization is implemented differently in each of the compensation functions 400a and 400b, as will be illustrated further below. More particularly, the compensation function 400a employs a direct sense equalization, while the compensation function 400b employs an inverse sense equalization.

Referring now to FIG. 4A, the matrix multiplication of drive sense signals and sense signals of compensation function 400a is illustrated and described in further detail. The downconverted sense in-phase and sense quadrature signals are received at block 404, e.g., from the downconverter block 308 of FIG. 3. The drive sense signals input to the matrix multiplication of block 404 may be based upon the drive displacement in-phase signal, the drive displacement quadrature signal, and the derived drive velocity in-phase signal and drive velocity quadrature signal derived from each of the displacement signals, respectively. In this example, the four drive sense signals are input to a sense channel model equalization block 406, the output of which is provided to an inverse matrix computation block 408. The output of the inverse matrix computation block 408 is provided to the matrix multiplication block 404.

As initially described above, the compensated sense in-phase signal (Coriolis Ω(t)) and compensated sense quadrature signal (Quadrature Q(t)) may be found by a matrix multiplication (i.e., at block 404) of a first matrix and a second matrix, with the first matrix being the inverse matrix computation of the drive displacement in-phase signal, the drive velocity in-phase signal, the drive displacement quadrature signal, and the drive velocity quadrature signal. The second matrix of the matrix multiplication may include the sense in-phase signal and the sense quadrature signal. The matrix multiplication may therefore be represented as follows:

$$\begin{bmatrix} \Omega(t) \\ Q(t) \end{bmatrix} = M^{-1}(t) \begin{bmatrix} x_{sI}(t) \\ x_{sQ}(t) \end{bmatrix}$$

where:
$x_{sI}(t)$ is the sense displacement in-phase signal; and
$x_{sQ}(t)$ is the sense displacement quadrature signal.
The matrix inversion $M^{-1}(t)$ input to the above matrix multiplication at block 404 may be determined from a matrix inversion, i.e., at block 408, of:

$$\begin{bmatrix} v_{dI}(t) & x_{dI}(t) \\ v_{dQ}(t) & x_{dQ}(t) \end{bmatrix}$$

where:
$v_{dI}(t)$ is the drive velocity in-phase signal;
$x_{dI}(t)$ is the drive displacement in-phase signal;
$v_{dQ}(t)$ is the drive velocity quadrature signal; and
$x_{dQ}(t)$ is the drive displacement quadrature signal.

Referring now to FIG. 4B, the matrix multiplication of drive sense signals and sense signals in the compensation function 400b is illustrated and described in further detail, as an example alternative implementation of sense equalization in comparison to the compensation function 400a. More specifically, in contrast to the downconverted sense in-phase and sense quadrature signals being received directly from the downconverter block 308 at block 404 as in compensation function 400a, the downconverted sense in-phase signal and the downconverted sense quadrature signals are input to sense equalization block 406b, the output of which is input to the matrix multiplication of block 404. Accordingly, the drive sense signals input to the matrix multiplication of block 404 in compensation function 400b may be based upon the drive displacement in-phase signal, the drive displacement quadrature signal, and the derived drive velocity in-phase signal and drive velocity quadrature signal derived from each of the displacement signals, respectively. In the example compensation function 400b, the four drive sense signals are input directly to the inverse matrix computation block 408. The output of the inverse matrix computation block 408 is provided to the matrix multiplication block 404.

As with compensation function 400a, in compensation function 400b may determine the compensated sense in-phase signal (Coriolis Ω(t)) and compensated sense quadrature signal (Quadrature Q(t)) by a matrix multiplication at block 404 of a first matrix and a second matrix, with the first matrix being the inverse matrix computation of the drive displacement in-phase signal, the drive velocity in-phase signal, the drive displacement quadrature signal, and the drive velocity quadrature signal. The second matrix may include the sense in-phase signal and the sense quadrature signal, and accordingly the matrix multiplication may be represented as follows:

$$\begin{bmatrix} \Omega(t) \\ Q(t) \end{bmatrix} = M^{-1}(t) \begin{bmatrix} x_{sI}(t) \\ x_{sQ}(t) \end{bmatrix}$$

where:
$x_{sI}(t)$ is the sense displacement in-phase signal; and
$x_{sQ}(t)$ is the sense displacement quadrature signal.
The matrix inversion $M^{-1}(t)$ input to the above matrix multiplication at block 404, may be determined from a matrix inversion, i.e., at block 408, of:

$$\begin{bmatrix} v_{dI}(t) & x_{dI}(t) \\ v_{dQ}(t) & x_{dQ}(t) \end{bmatrix}$$

where:
$v_{dI}(t)$ is the drive velocity in-phase signal;
$x_{dI}(t)$ is the drive displacement in-phase signal;
$v_{dQ}(t)$ is the drive velocity quadrature signal; and
$x_{dQ}(t)$ is the drive displacement quadrature signal.

As introduced above, the compensation functions 400a, 400b each also include a sense equalization at blocks 406a, 406b, respectively. The sense equalization functions 406a, 406b (collectively, 406) are based upon the recognition that the drive and the sense signals pass through two different paths. More specifically, the drive velocity and drive displacement signals [$v_d(t)$, $x_d(t)$] are affected by the MEMS drive transfer function. By comparison, the sense velocity signal $v_s(t)$ is affected initially by the drive transfer function because it includes the drive displacement and velocity, and then it is also distorted by the MEMS sense transfer function. For this reason, in order to properly process the matrix, the effects of the MEMS sense transfer function are removed from the sense signals, and subsequently the matrix processing may be applied to remove the effects of the drive and to correctly recover the compensated Coriolis and Quadrature functions, [Ω(t), Q(t)].

Figure 5:
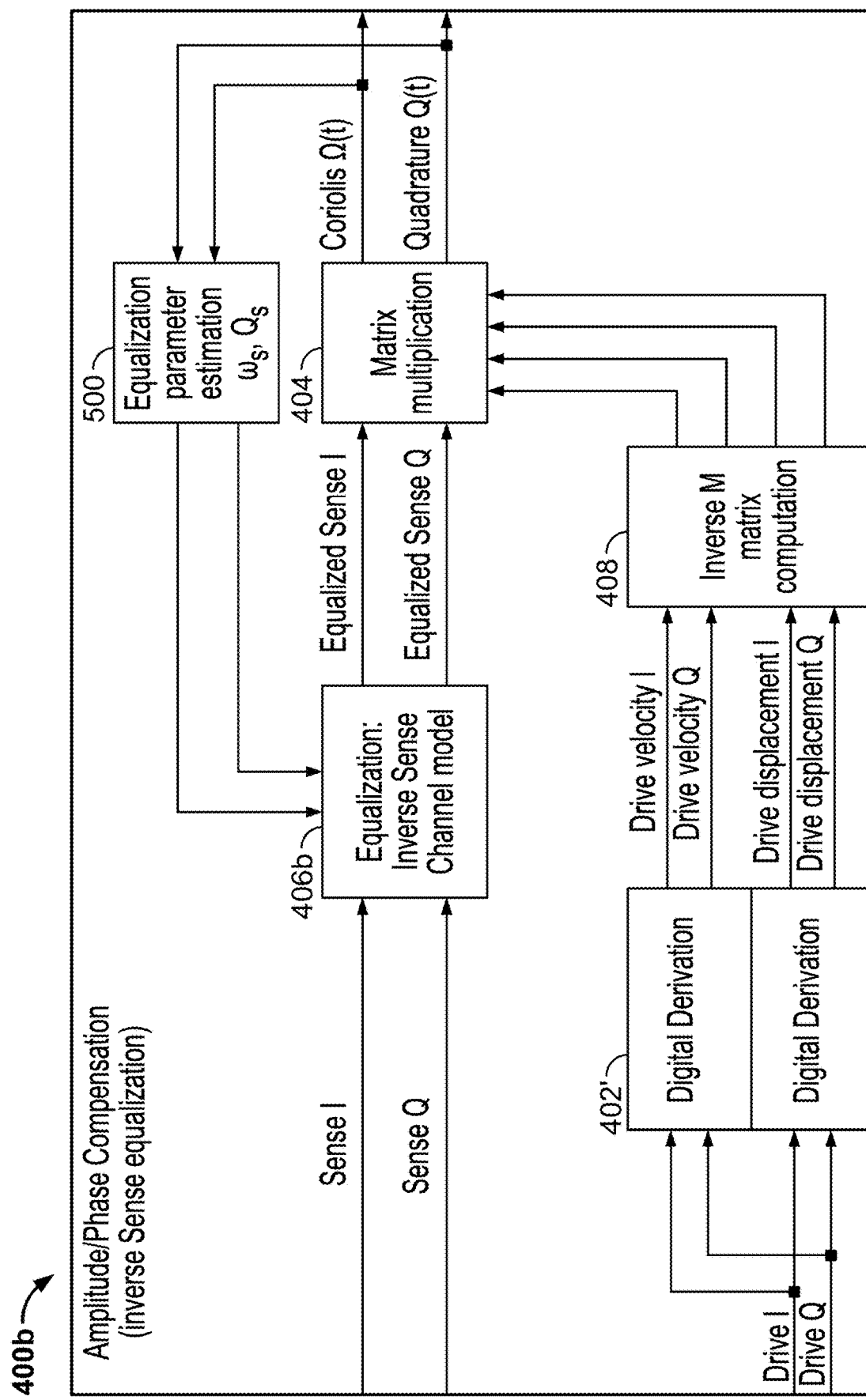
FIG. 5 illustrates an exemplary equalization parameter estimation function that may be applied in example compensation functions, in accordance with some embodiments of the present disclosure.

Parameters used in the sense equalization blocks 406a and 406b may be determined in any manner that is convenient. Turning now to FIG. 5, an example equalization parameter estimation function 500 is illustrated and described in further detail. The equalization parameter estimation 500 is implemented consistent with the use of sense equalization in compensation function 400b (i.e., with sense equalization applied to the downconverted sense in-phase signal and downconverted sense quadrature signal at block although it is possible to implement equalization parameter estimation in a manner corresponding to the compensation function 400a.

As discussed above, the drive velocity in-phase signal, drive velocity quadrature signal, drive displacement in-phase signal, and drive displacement quadrature signal may be used in an inverse matric computation at block 408, and input to the matrix multiplication 404. As shown in the example illustration of FIG. 5, determination of the drive velocity in-phase/quadrature signals may be achieved through a drive alignment by low-pass filter, and input to the inverse matrix computation at block 408. After the inverse matrix multiplication at block 408, effects of error in the drive sense signal are removed from the sense signals, i.e., the compensated sense in-phase signal and compensated sense quadrature signals. Accordingly, a preliminary step comprising a sense equalization may be sufficient to determine the compensated sense signals. Nevertheless, a model-based equalizer may be employed, with the equalization step being adaptive and in real-time, e.g., as illustrated in FIG. 5. For example, in a MEMS gyroscope a monitor signal may be injected in the sense signal path, such as an out-of-band tone. The sense channel model may be tuned by suitable values, for example matching the values developed upon initial setup or manufacture of the MEMS device. Accordingly, at equalizer parameter estimation block 500, the monitor signal may be observed upon initial setup or manufacture of the MEMS device to establish a baseline response or output of the MEMS device, which may be recorded. In one example, the baseline response may be recorded in the form of an amplitude of the sense in-phase signal and the sense quadrature signals. Periodically thereafter, deviations from the original observed values may be monitored, thereby tracking changes to model parameters as determined in the equalizer parameter estimation block 500. As a result, implementation of the inverse matrix computation to the drive sense signals, and the monitoring or tracking of sense equalizer parameters may generally provide a complete compensation against primary causes of both drive sense signal and sense signal variations in a MEMS gyroscope (e.g., temperature, aging, stress, etc.)

Figure 6:
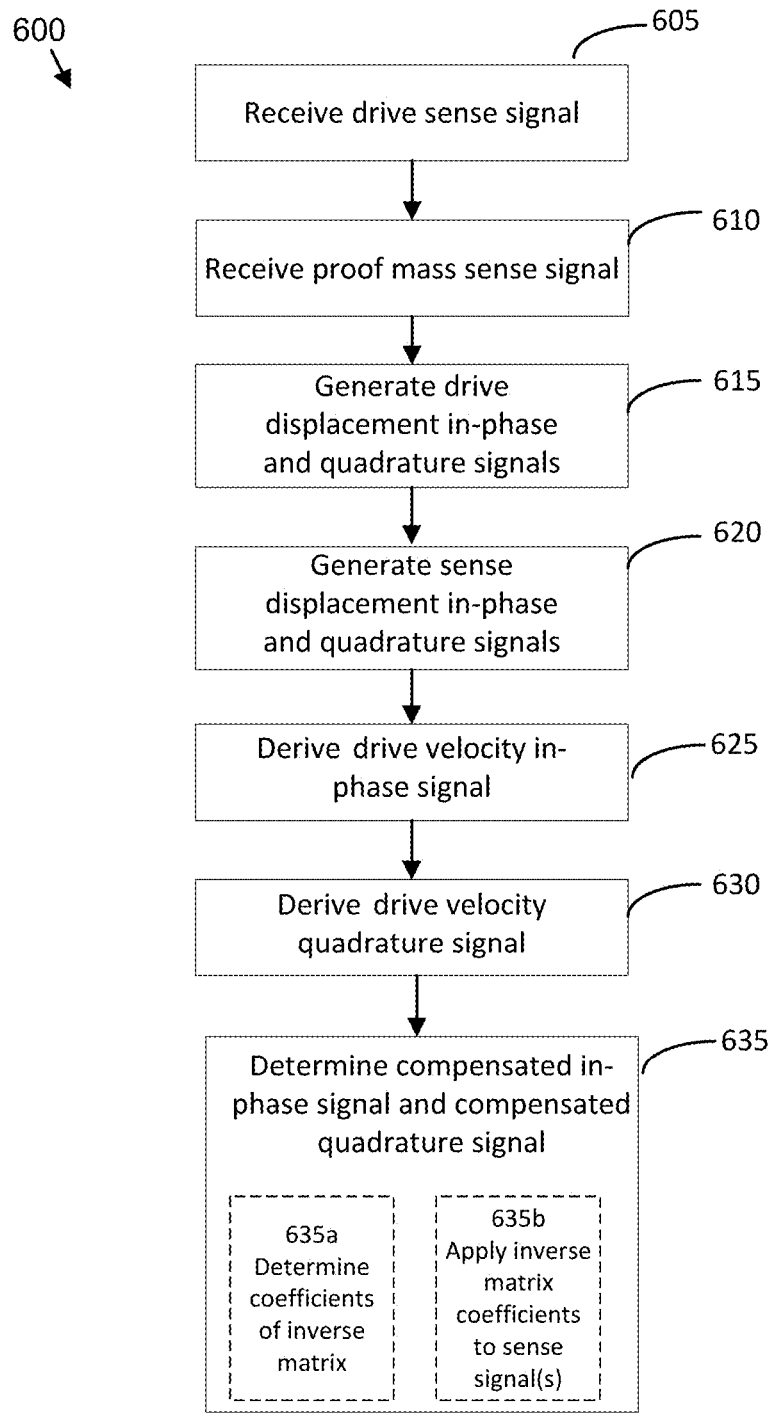
FIG. 6 depicts exemplary steps for compensating error(s) in a MEMS gyroscope, in accordance with at least some embodiments of the present disclosure.

Turning now to FIG. 6, an example process 600 of compensating for errors in a MEMS gyroscope is illustrated and described in further detail. Process 600 may begin at block 605. At block 605, a drive sense signal may be received at a processing circuitry from a drive sense electrode. For example, as discussed above a drive sense signal may correspond to a displacement of a drive mass of a suspended spring-mass system, e.g., of a MEMS gyroscope 200 or 302. Process 600 may then proceed to block 610.

At block 610, a proof mass sense signal may be received, e.g., at processing circuitry, from a proof mass sense electrode. For example, the proof mass sense signal may correspond to displacement of the proof mass(es) 210 of MEMS gyroscope 200 or MEMS gyroscope 302.

Proceeding to block 615, process 600 may generate from the drive sense signal both a drive displacement quadrature signal and a drive displacement in-phase signal. At block 620, process 600 may generate from the proof mass sense signal a sense displacement quadrature signal and a sense displacement in-phase signal. Process 600 may then proceed to block 625.

At block 625, process 600 may derive a drive velocity in-phase signal from the drive displacement in-phase signal. Proceeding to block 630, a drive velocity quadrature signal may be derived from the drive displacement quadrature signal. As examples of blocks 625 and/or 630, a derivation block 402 of compensation functions 400a or 400b may derive velocity from displacement inputs, as described above. Process 600 may then proceed to block 635.

At block 635, process 600 may determine, e.g., using processing circuitry, a compensated in-phase signal and a compensated quadrature signal from a plurality of drive sense signals and a plurality of sense signals. The compensated in-phase signal and the compensated quadrature signal may have a reduced error as a result of removing or reducing influence of drift, error, or variation in a drive signal. For example, as discussed above regarding the example compensation function 400a, the plurality of drive sense signals may include (a) the drive displacement in-phase signal $x_{dI}(t)$, (b) the drive displacement quadrature signal $x_{dQ}(t)$, (c) the drive velocity in-phase signal $v_{dI}(t)$, and (d) the drive velocity quadrature signal $v_{dQ}(t)$. Continuing in this example, the plurality of sense signals may include (a) the sense displacement in-phase signal $x_{sI}(t)$ and (b) the sense displacement quadrature signal $x_{sQ}(t)$. In the example process 600 illustrated in FIG. 6, block 635 may initially proceed to block 635a, where process 600 may calculate coefficients of the inverse matrix M−1. Proceeding to block 635b, process 600 may apply inverse matrix coefficients to the original sense signals I&Q to get the compensated Sense signals I&Q. Accordingly, in at least some example approaches the matrix inversion is applied to the sense displacement signal and the sense quadrature signal.

The determination of compensated sense signals may include, as discussed above in example compensation functions 400a, 400b, applying a matrix multiplication to the identified plurality of drive sense signals and the identified plurality of sense signals, e.g., in a matrix multiplication 404. The determination of compensated sense signals may also include application of a matrix inversion to the plurality of drive sense signals to determine a corresponding plurality of matrix inverted drive sense signals, e.g., at matrix inversion 408.

The determination of compensated sense in-phase and sense quadrature signals may also include an equalization function, as noted above. For example, equalization may be applied in the context of the direct sense transfer function structure of compensation function 400a, to the plurality of drive sense signals. Alternatively, equalization may be applied to sense signals, e.g., in an inverse sense transfer function as described above in connection with compensation function 400b. Further, the drive sense signals or sense signals may be equalized using equalizer parameters determined at an equalizer parameter estimation 500. Process 600 may then terminate.

Figure 7:
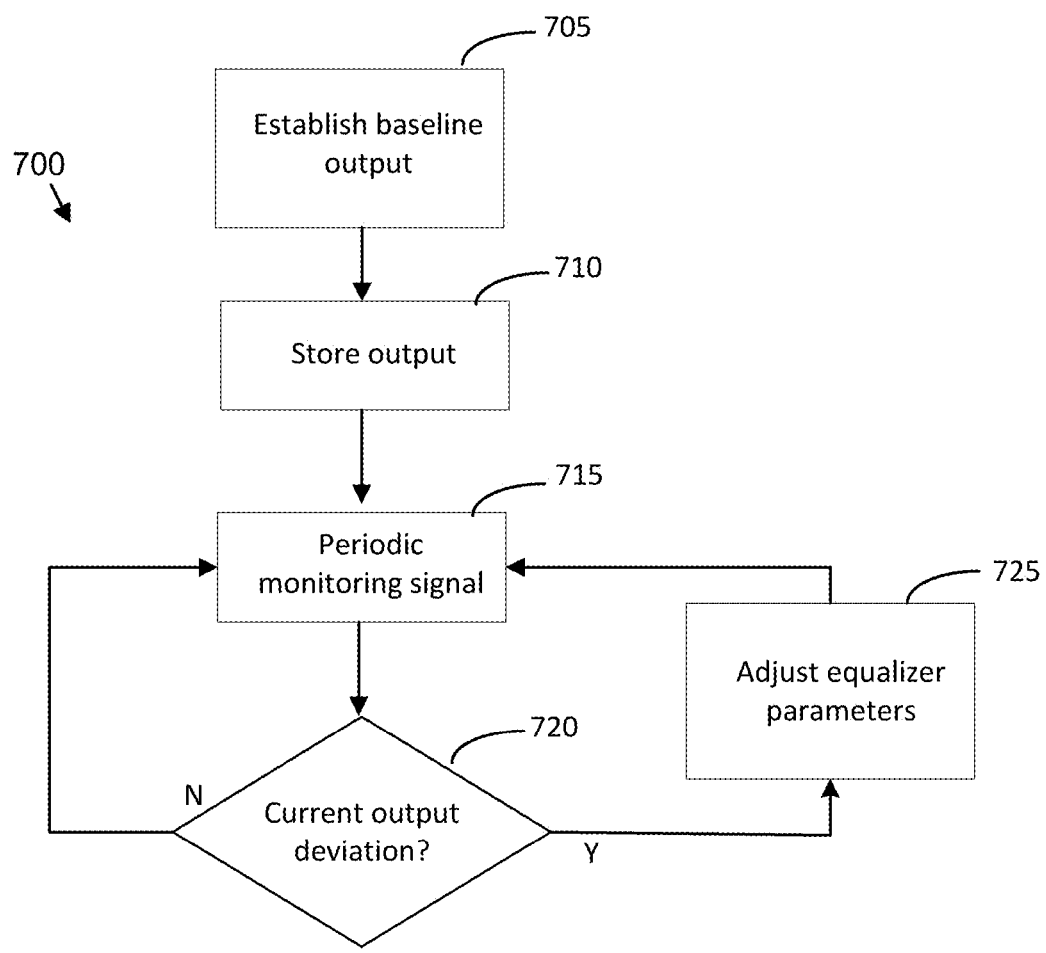
FIG. 7 depicts exemplary steps for monitoring a MEMS gyroscope for performance variations, e.g., due to errors, in accordance with at least some embodiments of the present disclosure.

Turning now to FIG. 7, an example process 700 of monitoring a MEMS gyroscope for performance variations, e.g., due to errors, is illustrated and described in further detail. Process 700 may be employed to apply equalization parameters, e.g., as discussed above. Process 700 may begin at block 705.

At block 705, a baseline output may be established. For example, as described above in the example of equalizer parameter estimation 500, a monitor signal may be input to a MEMS gyroscope upon initial setup or manufacture of the MEMS device to establish a baseline response.

Proceeding to block 710, the baseline response or output may be stored or recorded, e.g., in a memory of the MEMS device. More specifically, in an example a baseline response may be recorded in the form of an amplitude of the sense in-phase signal and the sense quadrature signals. Process 700 may then proceed to block 715.

At block 715, a periodic monitoring signal may be implemented at the MEMS device at any frequency that may be convenient. Merely as one example, an example MEMS gyroscope may implement a monitoring signal after a predetermined number of duty cycles, or after expiration of a period of time, e.g., once per week. In some examples monitoring may be performed online, i.e., also when the sensor is operating. This may be accomplished using out of band monitoring signals, for example. Accordingly, an example processing circuitry may be configured to generate a monitoring signal while the proof mass sense electrode is generating a proof mass sense signal, e.g., including the sense displacement quadrature signal and the sense displacement in-phase signal. In such examples of online monitoring, the timescale may be relatively short, e.g., once per second.

Proceeding to block 720, process 700 may query whether a deviation in equalization parameters has been established. For example, the original observed values established at blocks 705/710 may be compared with the result of block 715. Moreover, equalization parameters may be tracked over a period of time, i.e., to include measurements taken at more than two distinct points in time. Deviations in the equalizer parameters may be determined to exist when a difference between reference value(s) and a current value exceed a predetermined amount or magnitude, or a difference between reference and current values increases by a predetermined amount over a predetermined period of time, merely as examples. Where block 720 establishes a difference between current and reference values, process 700 may proceed to block 725 where equalizer parameter(s) may be adjusted. Alternatively, if a deviation in equalizer parameters has not been established at block 725, process 700 may proceed back to block 715. Accordingly, periodic monitoring of the equalizer parameters may continue.

The matrix-based compensation or processing in the examples herein may generally correct variations in drive amplitude and phase of a MEMS gyroscope or device in real time. Additionally, a drive subsystem can be duty cycled to provide further compensation to both amplitude and frequency outputs. As another optional approach, the drive sense signal may be randomized to improve performances against harmonics, vibration, etc.

The compensated sense signals, i.e., the sense Coriolis and sense quadrature signals, may be further compensated in some examples, e.g., with an equalization function. Further, a MEMS quadrature, resonance frequency and quality factor can be measured using the digital system and adaptively equalized.

The processing and compensation strategies described above generally provide a clean sense signal at output, i.e., that reduces or eliminates error due to variations in drive mass output. Moreover, this reduction in error may be true regardless of the waveform used for the excitation of the drive mass.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A micro electro-mechanical system (MEMS) gyroscope, comprising:
    a suspended spring-mass system, including a drive mass and a proof mass;
    a drive sense electrode for generating a drive sense signal corresponding to displacement of the drive mass;
    a proof mass sense electrode for generating a proof mass sense signal corresponding to displacement of the proof mass; and
    processing circuitry configured to:
        receive the drive sense signal;
        receive the proof mass sense signal;
        generate from the drive sense signal a drive displacement quadrature signal and a drive displacement in-phase signal;
        generate from the proof mass sense signal a sense displacement quadrature signal and a sense displacement in-phase signal;
        derive a drive velocity in-phase signal from the drive displacement in-phase signal;
        derive a drive velocity quadrature signal from the drive displacement quadrature signal; and
        determine a compensated in-phase sense signal and a compensated quadrature sense signal based upon the drive displacement in-phase signal, the drive displacement quadrature signal, the drive velocity in-phase signal, the drive velocity quadrature signal, the sense displacement in-phase signal, and the sense displacement quadrature signal.

2. The MEMS gyroscope of claim 1, wherein the processing circuitry is configured to determine the compensated in-phase sense signal and the compensated quadrature sense signal based upon at least a matrix multiplication of a first matrix and a second matrix, the first matrix based upon the drive displacement in-phase signal, the drive displacement quadrature signal, the drive velocity in-phase signal, and the drive velocity quadrature signal, the second matrix including the sense displacement in-phase signal and the sense displacement quadrature signal.

3. The MEMS gyroscope of claim 1, wherein the processing circuitry is configured to determine the compensated in-phase sense signal and the compensated quadrature sense signal based upon at least a matrix inversion applied to the drive displacement in-phase signal, the drive displacement quadrature signal, the drive velocity in-phase signal, and the drive velocity quadrature signal to determine a plurality of inverted matrix drive signals.

4. The MEMS gyroscope of claim 3, wherein the processing circuitry is configured to determine the compensated in-phase sense signal and the compensated quadrature sense signal based upon at least a matrix multiplication of a first matrix and a second matrix, the first matrix including the plurality of inverted matrix drive signals, the second matrix including the sense displacement in-phase signal and the sense displacement quadrature signal.

5. The MEMS gyroscope of claim 1, wherein the processing circuitry is configured to determine the compensated in-phase sense signal and the compensated quadrature sense signal by equalizing at least one of the drive displacement in-phase signal, the drive displacement quadrature signal, the sense displacement in-phase signal, or the sense displacement quadrature signal.

6. The MEMS gyroscope of claim 5, wherein the processing circuitry is configured to apply a direct sense transfer function to at least one of the drive displacement in-phase signal, the drive displacement quadrature signal, the drive velocity in-phase signal, or the drive velocity quadrature signal.

7. The MEMS gyroscope of claim 5, wherein the processing circuitry is configured to apply an inverse sense transfer function to at least one of the sense displacement in-phase signal or the sense displacement quadrature signal.

8. The MEMS gyroscope of claim 5, further comprising estimating an equalizer parameter based upon the sense displacement in-phase signal and the sense displacement quadrature signal.

9. The MEMS gyroscope of claim 1, wherein the processing circuitry is configured to determine the compensated sense in-phase signal and the compensated sense quadrature signal such that an error imparted by one of the drive displacement in-phase signal, the drive displacement quadrature signal, the drive velocity in-phase signal, or the drive velocity quadrature signal is reduced.

10. The MEMS gyroscope of claim 1, wherein the processing circuitry is configured to generate a monitoring signal while the proof mass sense electrode is generating a proof mass sense signal.

11. A method of compensating for drive signal-induced error in a micro electro-mechanical system (MEMS) gyroscope having a suspended spring-mass system including a drive mass and a proof mass, the method comprising:
    receiving, at a processing circuitry, a drive sense signal from a drive sense electrode, the drive sense signal corresponding to displacement of the drive mass;
    receiving, at the processing circuitry, a proof mass sense signal from a proof mass sense electrode, the proof mass sense signal corresponding to displacement of the proof mass;
    generating, from the drive sense signal, a drive displacement quadrature signal and a drive displacement in-phase signal;
    generating, from the proof mass sense signal, a sense displacement quadrature signal and a sense displacement in-phase signal;
    deriving a drive velocity in-phase signal from the drive displacement in-phase signal;
    deriving a drive velocity quadrature signal from the drive displacement quadrature signal; and
    determining, using the processing circuitry, a compensated sense in-phase signal and a compensated sense quadrature signal based upon the drive displacement in-phase signal, the drive displacement quadrature signal, the drive velocity in-phase signal, the drive velocity quadrature signal, the sense displacement in-phase signal, and the sense displacement quadrature signal.

12. The method of claim 11, further comprising multiplying a first matrix and a second matrix with the processing circuitry, the first matrix based upon the drive displacement in-phase signal, the drive displacement quadrature signal, the drive velocity in-phase signal, and the drive velocity quadrature signal, the second matrix including the sense displacement in-phase signal and the sense displacement quadrature signal.

13. The method of claim 11, further comprising applying, with the processing circuitry, a matrix inversion to the drive displacement in-phase signal, the drive displacement quadrature signal, the drive velocity in-phase signal, and the drive velocity quadrature signal to determine a plurality of inverted matrix drive signals.

14. The method of claim 13, further comprising multiplying a first matrix and a second matrix with the processing circuitry, the first matrix including the plurality of inverted matrix drive signals, the second matrix including the sense displacement in-phase signal and the sense displacement quadrature signal.

15. The method of claim 11, further comprising equalizing at least one of the drive displacement in-phase signal, the drive displacement quadrature signal, the drive velocity in-phase signal, the drive velocity quadrature signal, the sense displacement in-phase signal, or the sense displacement quadrature signal.

16. The method of claim 15, further comprising applying a direct sense transfer function to at least one of the drive displacement in-phase signal, the drive displacement quadrature signal, the drive velocity in-phase signal, or the drive velocity quadrature signal.

17. The method of claim 15, further comprising applying an inverse sense transfer function to at least one of the sense displacement in-phase signal or the sense displacement quadrature signal.

18. The method of claim 11, wherein determining the compensated sense in-phase signal and the compensated sense quadrature signal includes reducing an error imparted by at least one of the drive displacement in-phase signal, the drive displacement quadrature signal, the drive velocity in-phase signal, or the drive velocity quadrature signal.

19. The method of claim 11, further comprising generating a monitoring signal while the proof mass sense electrode is generating the sense displacement quadrature signal and the sense displacement in-phase signal.

20. The method of claim 11, further comprising generating a monitoring signal after one of a predetermined number of duty cycles or a period of time.

\* \* \* \* \*